United States Patent
Bates

(10) Patent No.: US 8,250,316 B2
(45) Date of Patent: Aug. 21, 2012

(54) WRITE CACHING RANDOM DATA AND SEQUENTIAL DATA SIMULTANEOUSLY

(75) Inventor: Kenneth Hoffman Bates, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 430 days.

(21) Appl. No.: 11/448,333

(22) Filed: Jun. 6, 2006

(65) Prior Publication Data

US 2007/0283086 A1 Dec. 6, 2007

(51) Int. Cl.
- G06F 12/00 (2006.01)
- G06F 13/00 (2006.01)
- G06F 13/28 (2006.01)

(52) U.S. Cl. .................................... 711/154
(58) Field of Classification Search .................... 711/154
See application file for complete search history.

(56) References Cited

U.S. PATENT DOCUMENTS

| | | | |
|---|---|---|---|
| 5,233,618 A | 8/1993 | Glider et al. | |
| 5,475,697 A | 12/1995 | Katz et al. | |
| 5,555,391 A | 9/1996 | De Subijana et al. | |
| 5,734,861 A | 3/1998 | Cohn et al. | |
| 6,058,455 A | 5/2000 | Islam et al. | |
| 6,219,752 B1 | 4/2001 | Sekido | |
| 6,279,077 B1 | 8/2001 | Nasserbakht et al. | |
| 6,480,936 B1 * | 11/2002 | Ban et al. | 711/118 |
| 6,513,094 B1 | 1/2003 | Magro | |
| 6,567,888 B2 | 5/2003 | Kedem | |
| 6,732,292 B2 | 5/2004 | Hertz et al. | |
| 6,772,310 B2 | 8/2004 | Thompson | |
| 6,789,163 B2 | 9/2004 | Fox et al. | |
| 6,898,669 B2 | 5/2005 | Tomita | |
| 6,925,526 B2 | 8/2005 | Hall | |
| 6,986,019 B1 * | 1/2006 | Bagashev et al. | 711/217 |
| 2003/0217230 A1 * | 11/2003 | Rodriguez et al. | 711/136 |
| 2004/0093463 A1 * | 5/2004 | Shang | 711/113 |
| 2004/0148484 A1 * | 7/2004 | Watanabe et al. | 711/170 |
| 2004/0160975 A1 * | 8/2004 | Frank et al. | 370/432 |
| 2006/0069871 A1 * | 3/2006 | Gill et al. | 711/118 |

\* cited by examiner

Primary Examiner — Kevin Ellis
Assistant Examiner — Chad Davidson
(74) Attorney, Agent, or Firm — Hall Estill Attorneys at Law

(57) ABSTRACT

A method and apparatus associated with transferring data from a remote device to a recipient device having a first memory space and a second memory space. The method includes issuing a transfer command from the remote device to request transferring a set of data to the second memory space; temporarily storing the set of data in the first memory space pending a transfer to the second memory space; and appending the set of data to other sequential data in the first memory to obtain a transfer data block of a predetermined size for transfer to the second memory space. A corresponding apparatus is provided comprising circuitry configured to buffer write commands by characterizing each write command as being either a sequential write or a random write, and responsively appending data associated with sequential write commands in order to obtain a transfer block of a predetermined size.

20 Claims, 4 Drawing Sheets

WRITE CACHING RANDOM DATA AND SEQUENTIAL DATA SIMULTANEOUSLY

FIELD OF THE INVENTION

The embodiments of the present invention relate generally to the field of data storage systems and more particularly, but without limitation, to an apparatus and associated method for efficiently write caching data that are accessed differently.

BACKGROUND

Data storage devices are used to access digital data in a fast and efficient manner. With the proliferation of data storage devices being employed in consumer electronics devices, it is now not unusual for a remote host to access different data within a data storage device in completely different ways. Generally, two types of data can be categorized as being either normal computer data or audio/visual (A/V) data.

Normal computer data is accessed in a more traditional way, whereby the content of the data itself is essential to successfully executing the computer processes, tracking the processes, and reporting results of the processes. For this reason, each bit of normal computer data is potentially critical to the operational flow of the computer process.

On the other hand, A/V data relates to computer readable information that when executed produces audio signals and/or video signals through a speaker or a monitor. The performance with which this type of a sequential stream of a large volume of data can be read as a single command is fundamentally more important than its bit-by-bit accuracy. That is, if some of the A/V data is in error, the error can usually be passed on to the host without noticeable corruption of the A/V signal, at least in comparison to the delays that would otherwise occur were the A/V data scrutinized the same as normal data. Because of its nature A/V data is sequential data, such that by comparison normal data is thus sometimes referred to as "random data."

It is becoming prevalent that the host must be capable of accessing both random data and sequential data within the same storage space. Write caching is generally associated with temporarily receiving data from host access commands into a buffer and then optimally scheduling the actual transfer of the data from or to the storage device. Because sequential data is presented in a format already suited for optimal transfer, write caching is usually not necessary for host access commands associated with sequential data. However, write caching is an advantageous way of increasing the data transfer rate for host access commands associated with random data. Intermingling both types of data in the same buffer can be problematic, likely resulting in bottlenecking the ultimate transfers of random data and unnecessarily fragmenting sequential data threads. What is needed is a straightforward way of buffering a mixture of both random and sequential data that optimizes the overall data transfer efficiency of the blend. It is to these improvements that the embodiments of the present invention are directed.

SUMMARY OF THE INVENTION

Embodiments of the present invention are generally directed to an apparatus and associated methodology for write caching access commands in a data storage device.

In some embodiments a method is provided for transferring data from a first device to a recipient device having a first memory space and a second memory space. The method includes receiving a transfer command from the first device to request transferring a set of data to the second memory space; temporarily storing the set of data in the first memory space pending a transfer to the second memory space; and appending the set of data to other sequential data in the first memory to obtain a transfer data block of a predetermined size for transfer to the second memory space.

In some embodiments a corresponding apparatus is provided comprising circuitry configured to buffer write commands by characterizing each write command as being either a sequential write or a random write, and responsively appending data associated with sequential write commands in order to obtain a transfer block of a predetermined size.

In some embodiments a data storage device is provided having a first memory and a second memory, and means for transferring data from an external device to the second memory by buffering the data in the first memory and transferring it to the second memory in a manner of a plurality of different manners depending on the type of data being transferred.

These and various other features and advantages which characterize the claimed invention will become apparent upon reading the following detailed description and upon reviewing the associated drawings.

DETAILED DESCRIPTION

Figure 1:
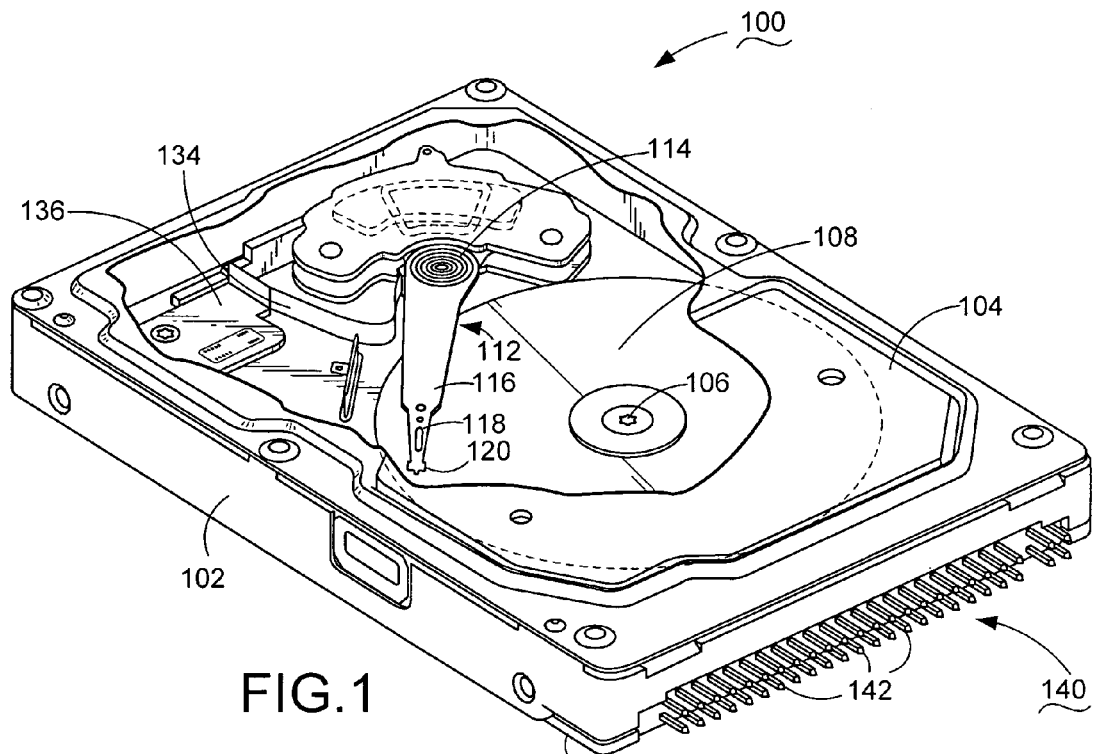
FIG. 1 is an isometric view of a data storage device constructed in accordance with embodiments of the present invention.

Referring to the drawings in general, and more particularly to FIG. 1 that shows an isometric view of a data storage device 100 constructed in accordance with embodiments of the present invention. The device 100 preferably includes a base 102 and a cover 104 (partially cutaway), which together provide a housing for a number of components. The components include a motor 106 to which one or more data storage mediums 108 are mounted for rotation therewith. Adjacent the medium 108 is an actuator assembly 112 that pivots around a bearing assembly 114. The actuator assembly 112 includes an actuator arm 116 supporting a load arm 118 that, in turn, supports a head 120 in a data transfer relationship with the adjacent medium 108. Each medium 108 can be divided into data tracks, and the head 120 is positioned to retrieve data from and store data to the tracks.

To provide the requisite electrical conduction paths between the head 120 and device 100 control circuitry, head wires can be routed on the actuator assembly 112 from the head 120, along the load arm assembly 118 and the actuator arm 116, and to a flex circuit 134. The head wires are thus connected to one end of the flex circuit 134 and the other end is connected to a flex circuit bracket 136. There the electrical connections pass through the base 102 to a printed circuit board (PCB) 138, which can be mounted externally to the enclosure. An electrical connector 140 attached to the PCB 138 has a plurality of contacts 142 for connecting the device 100 to a mating connector (not shown), such as for placing the device 100 in communication with external control circuitry.

Figure 2:
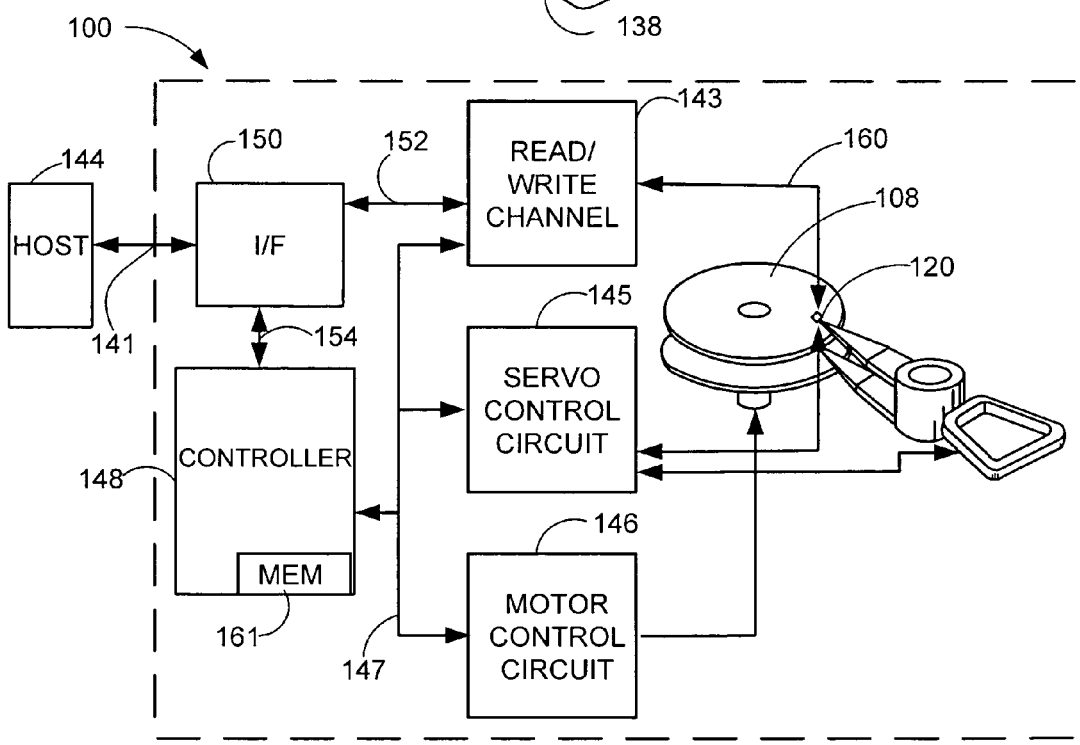
FIG. 2 is a functional block diagram of the data storage of FIG. 1 connected to a remote device.

FIG. 2 is a functional block diagram illustrating types of control signals and data transfers that are passed between the device 100 and a remote device, such as with a host 144 via a bus 141 shown in the embodiments of FIG. 2. In some embodiments the bus 141 and other buses described below can be a hard-wired interface, in equivalent alternative embodiments they can be a wireless communications interface. The device 100 generally has a read/write channel 143, a servo control circuit 145, and a motor control circuit 146, all connected by a control bus 147 to a controller 148. An interface circuit 150 is connected to the read/write channel 143 by bus 152 and to the controller 148 by bus 154. The interface circuit 150 serves as a communications interface between the device 100 and the host device (or other remote device such as a network server). Generally, in response to an access command from the host 144 and received by the controller 148 from the interface 150, the controller 148 controls the flow of data to and from the medium 108. The read/write channel 143, in turn, provides store and retrieve signals to the head 120 in order to store data to the medium 108 and retrieve data from the medium 108. A buffer 161 exists under the control of the controller 148 in order to temporarily store data associated with host 144 access commands with the medium 108. The head 120 can, for example, provide an analog read signal to the read/write channel 143, which in turn converts the analog read signal to digital form and performs the necessary decoding operations to provide data to the interface circuit 150 for output to the host 144.

Preferably, the data storage device can be configured as an audio visual ready (A/V-ready) drive. This requires that data stored on the data storage device be accessible by the host 144 in entirely different manners. That is, communications between the data storage device 100 and the host 144 can occur for access commands associated with reliability-critical data according to any of a number of standard protocols, such as the Advanced Technology Attachment/Advanced Technology Attachment Packet Interface (ATA/ATAPI) protocol. Clearly, in equivalent alternative embodiments this communication could occur over other protocols such as but not limited to Small Computer Systems Interface (SCSI), FibreChannel-Arbitrated Loop (FC-AL), Serial Storage Architecture (SSA), Compact-Flash, and the like.

For purposes of the present description and meaning of the appended claims, "reliability-critical data" or "random data" means computer data such as is generally associated with normal user data that requires full error recovery because its content is formalistically critical to computer process mission accomplishment.

Although ATA compliant, the data storage device 100 can also be made AV-ready for data transfer commands associated with time-critical data. For purposes of the present description and meaning of the appended claims, "time-critical data" or "sequential data" means computer data such as is generally associated with audio and/or visual data where commands must be completed within a specified time limit due to the streaming effects associated with transferring large chunks of the data. Errors that cannot be corrected within the time constraint can be transferred to the host and reported as such without significant loss of signal quality. The increased data transfer performance is accomplished by enabling relatively large command counts transferring large amounts of sectors with a single data transfer command, while adjusting the number of retries that would normally occur in relation to the associated time constraint.

Figure 3:
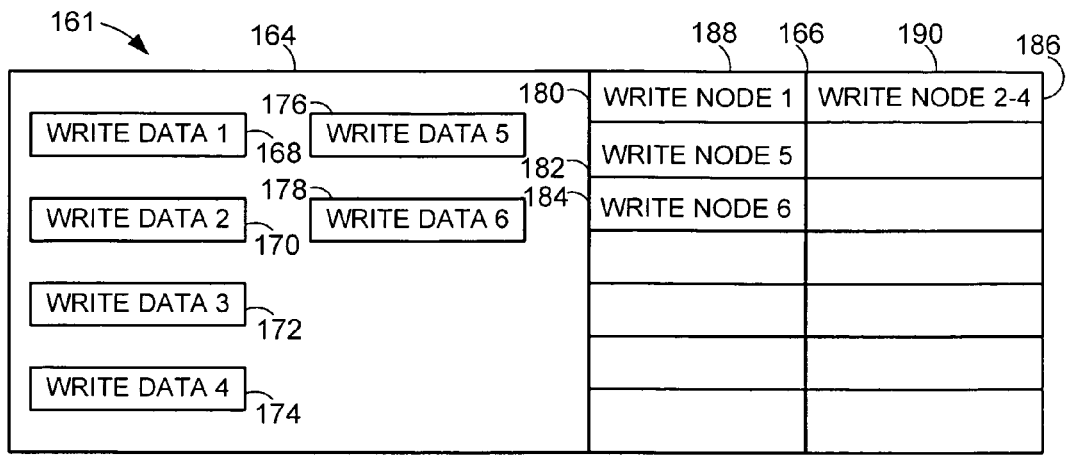
FIGS. 3 and 4 are diagrammatic representations of the buffer of the data storage device of FIG. 1.

FIG. 3 is a diagrammatical representation of the buffer 161 which can have an addressable memory space 164 and an associated command queue 166. The addressable memory space 164 temporarily stores blocks of read and write data associated with access commands from the host 144 in communication with the data storage device 100. For purposes of simplifying the present discussion only write data blocks 168, 170, 172, 174, 176, 178 are shown in the addressable memory space 164. It will be understood that normally other types of data such as but not limited to read data, read on arrival data, read look-ahead data, and the like will reside in the buffer simultaneously with the write data shown. Also, for purposes of the present description and meaning of the appended claims the addressable memory space 164 is sometimes referred to as a first memory and the medium 108 is sometimes referred to as a second memory.

The write data blocks are sometimes referred to as "writeback data" because the data storage device 100 sends a command complete signal to the host 144 when the write data is stored in a segment of the addressable storage space 164, prior to it being transferred to the medium 108. This increases the data transfer rate over the bus 141, and increases the operating efficiency of transferring data by accumulating a higher number of pending data transfers and thereby statistically increasing the likelihood that combinatorial threads of data blocks can be formed for transferring as a single command node.

For illustrative purposes the writeback data 168, 170, 172, 174, 176, 178 are labeled sequentially according to when each was stored in a segment of the addressable memory space 164. That is, writeback data 168 is labeled "WRITE DATA 1" because it was first stored and writeback data 178 is labeled "WRITE DATA 6" because it was last stored, among the six writeback data blocks illustrated.

As each writeback data block is received in the buffer 161 the data storage device 100 creates a command node which is a sortable and queryable access instruction placed in the command queue 166. Again, as above, for simplicity sake the command queue 166 presently contains only write nodes 180, 182, 184, 186 associated with the writeback data stored in the addressable memory 164. Typically, however, the command queue 166 will contain other types of command nodes associated with data other than write commands, as discussed above.

When new writeback data is received by the buffer 161, the data storage device 100 queries all the other writeback data residing there in order to determine whether any sequential relationship(s) exist. By "sequential" it is meant that the logical addresses of memory space allocated for storing two or more writeback data blocks are continuous such that no non-allocated storage space exists between the two adjacent sequential writeback blocks. In FIG. 3, for illustration, write nodes 180, 182, 184 are associated with random writeback data and organized in a random command queue 188. However, it has been determined that writeback data blocks 170, 172, 174 are sequential data and are hence appended together, thereby becoming the subject of a single write node 186 in a sequential command queue 190. By appending the set of sequential data before transferring it, a transfer block of data can be obtained for transferring the sequential data as a predetermined optimal size. Although the random and sequential command queues 188, 190 are illustrated separately for description sake, both queues can exist and be intermingled within a common memory space.

Figure 4:
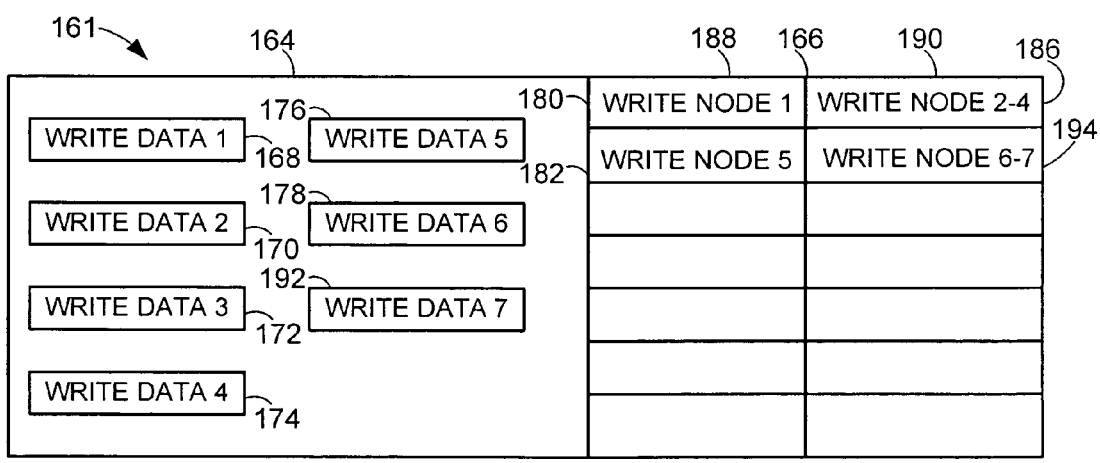

As discussed above, as new writeback data enters the buffer 161 all the existing writeback data existing in the buffer are queried for the existence of a sequential data relationship. This means that writeback data previously categorized as being random data can be changed to be sequential data if it is found to be sequential to the newest writeback data. For example, writeback data 178 in FIG. 3 is random data and subject to the write node 184 in the random command queue 188. However, FIG. 4 illustrates that newest writeback data 192, "WRITE DATA 7," is sequential to writeback data 178. Furthermore, FIG. 4 illustrates a case whereby writeback blocks 178, 192 are sequential with respect to each other, but not sequential with respect to the other sequential writeback blocks 170, 172, 174 associated with the write node 186. Accordingly, a second write node 194 has been created in the sequential command queue 190, and the former write node 184 in the random command queue 188 has been deleted.

In this manner two or more different sequential threads can be appended simultaneously in the buffer 161. That is, new writeback data can be appended to either of the sequential node commands 186, 194 until a predetermined transfer block size is obtained. Conceivably, new writeback data block could append two different sequential nodes. For example, if a new writeback data block is determined to be sequential to both of the sequential nodes 186, 194 then they could be combined into a different sequential node.

Figure 5:
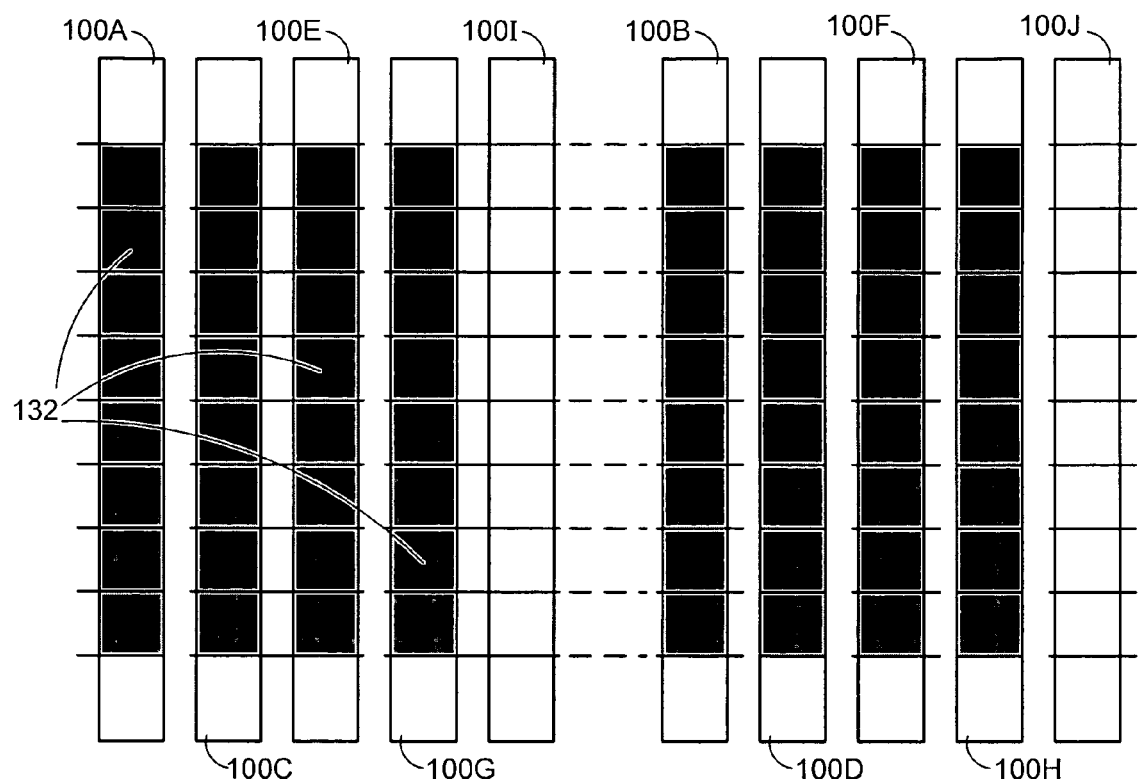
FIG. 5 is a diagrammatic representation of a grid-based storage array in a distributed storage system.

It can be advantageous to correlate the predetermined data transfer block size to the size of a stripe of data storage capacity in a distributed storage system, such as in a random array of independent drives (RAID). FIG. 5, for example, shows a grid-based storage architecture in terms of a plurality of data storage domains, (data storage devices 100A-100J) along one axis against rows made by combining a block of storage capacity 132 from each of the domains. The total storage capacity in a row is sometimes referred to as a stripe of storage space, the stripes being depicted by the shaded blocks in each row. Spare blocks 132 can be included in the stripes, as illustrated by the non-shaded blocks 132 from data storage devices 100I and 100J.

Thus it will be clear that the present embodiments aim to preferentially append sequential data in one or more threads to ultimately obtain a transfer block of a predetermined size for more efficiently transferring relatively large blocks of data with single commands. This can require flushing policies that favor retaining sequential data in the buffer 161 over random data. For example, the data storage device 100 can predetermine and set a random data queue threshold. If the amount of writeback data associated with the random data queue exceeds the threshold then the random data queue will be flushed, even if the least frequently used (LFU) data or the least recently used (LRU) data is within the sequential threads being appended. The random data queue threshold in the buffer 161 can be set to match the purpose for which the data storage device 100 is being employed, and can even be made adjustable by the data storage device 100 in the event of changing circumstances and/or performance requirements. In some embodiments it has been found advantageous to set the random data queue threshold at about five percent of the total buffer capacity, making it clearly preferential that the buffer 161 retain and append sequential data over random data. The flushing policy for the sequential data can then be set to flush when the amount of sequential data stored in the buffer exceeds the total buffer capacity less the random data queue threshold, and preferably less a safety factor such as about 5% of the total buffer storage capacity.

Figure 6:
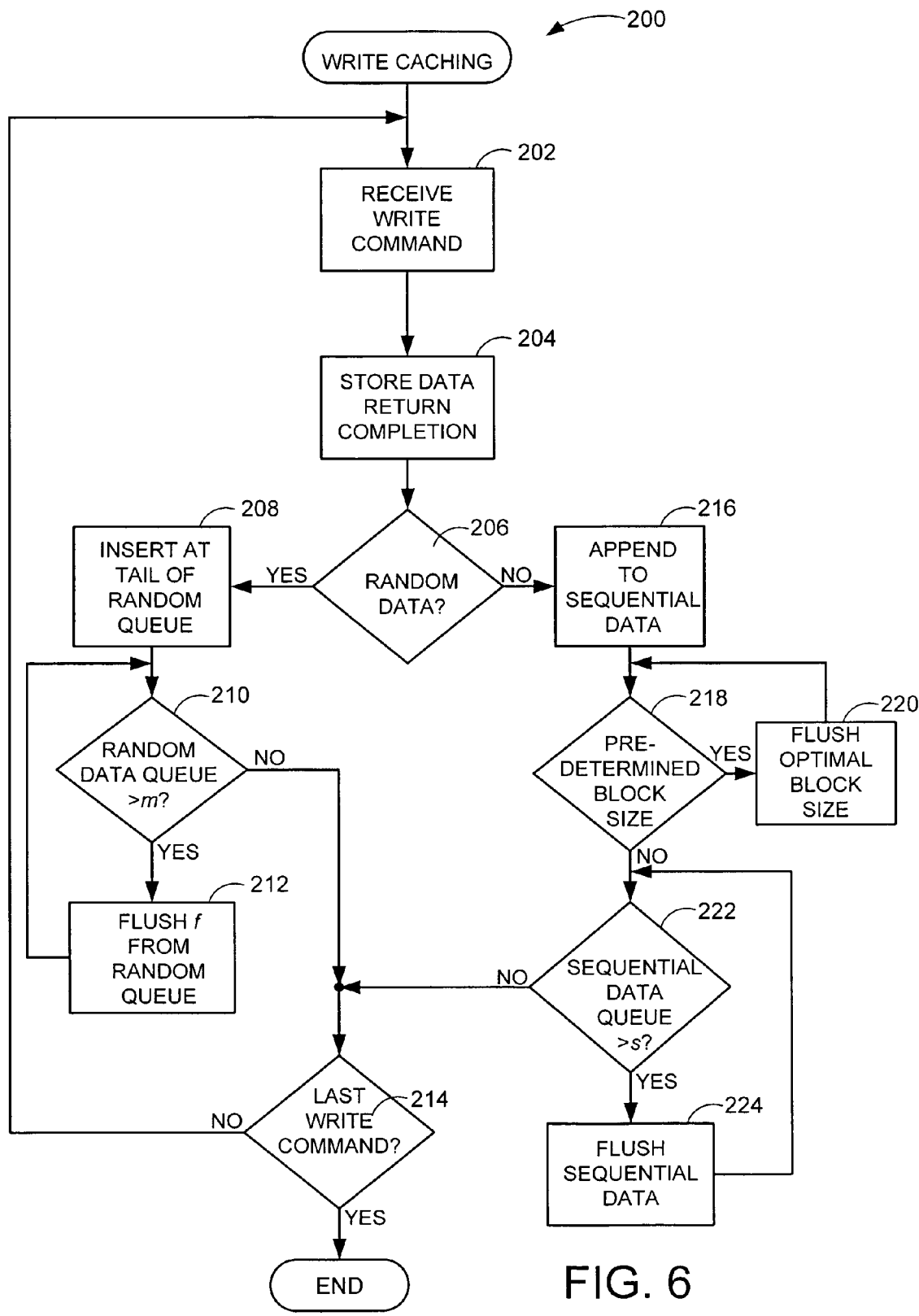
FIG. 6 is a flow chart illustrating steps for practicing a method of write caching in accordance with embodiments of the present invention.

FIG. 6 is a flowchart illustrating exemplary steps for practicing a method 200 for write caching in accordance with embodiments of the present invention. The method begins with receiving a new write command from the host in block 202. The writeback data is stored in the buffer and a completion signal is returned to the host in block 204. In block 206 the address of this newest writeback data is compared to all the other writeback data presently stored in the buffer in order to determine whether the newest writeback data is random data or not.

If the determination of block 206 is yes, then the write node associated with the latest writeback data is inserted at the tail of the random data queue in block 208. In block 210 it is determined whether the amount of random data in the buffer is greater than a predefined threshold, m. The threshold m can be adjusted by the data storage device depending on its use and/or varying operating performance requirements. In some experimental trials of the present embodiments it was found advantageous to set m as being about five percent of the total buffer storage capacity. If the determination of block 210 is yes, then an amount f of random data is flushed from the random data queue in block 212, and then control returns to block 210 to again check the amount of buffered random data in comparison to the threshold m. The variable f can likewise be adjusted by the data storage device depending on operating conditions and varying requirements, but in successful experimentation with the present embodiments it was found that 128 KB was an advantageous value for f. If the determination of block 210 is no, then control passes to block 214 where it is determined whether there is another pending write command. If so, then control returns to block 202; otherwise the method ends.

However, if the determination of block 206 is no then control passes to block 216 where the writeback data, having been determined to be sequential data, is appended to other sequential writeback data. In block 218 it is determined whether any of the sequential data threads have been obtained with a length that matches the predetermined block transfer size. If the determination of block 218 is yes, then the sequential data is flushed in block 220 and control returns to block 218. If the determination of block 218 is no, then control passes to block 222 where it is determined, notwithstanding there are no optimal length sequential threads, whether the total amount of sequential data exceeds the threshold s. The threshold s is a function of the total buffer capacity less the random queue threshold m, and preferably less a safety factor to prevent a surge of write commands from overrunning the buffer capacity. In experimental trials of the present embodiments it was determined that a five percent safety factor was sufficient to prevent such an occurrence. If the determination of block 222 is no, then control passes to block 214, and then either back to block 202 or the method ends. If the determination of block 222 is yes, then sequential data is flushed. Preferably the entirety of one or more sequential data threads are flushed because of the efficiency-related advantages associated with the sequentially transferred data. The sequential data thread selected for flushing can be the one or ones where a preponderance of the least recently used data and/or the least frequently used data exists.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the devices in which they are incorporated or the particular environment in which they are used without departing from the spirit and scope of the present invention.

In addition, although the illustrative embodiments described herein are directed to a data storage system, it will be appreciated by those skilled in the art that the claimed subject matter is not so limited and various other electronic devices can utilize the embodiments of the present invention without departing from the spirit and scope of the claimed invention.

What is claimed is:

1. A recipient device having a first memory space and a second memory space, and further comprising:
    a command queue in the first memory space operably indexing a plurality of sequential command nodes corresponding to sequential write data stored in the first memory space and concurrently indexing a plurality of random command nodes corresponding to random write data stored in the first memory space; and
    circuitry executing programming instructions appending together the sequential write data and the random write data forming a sequential write string in order to obtain a transfer block of a predetermined size for executing write commands from a host device to the second memory space.

2. A recipient device having a first memory space and a second memory space, and further comprising:
    a command queue; and
    circuitry executing programming instructions to buffer write command nodes in the command queue corresponding to write data stored in the first memory space by characterizing each newly received write command from a host device as being either part of a sequential write string or a random write in relation to two or more previously buffered command nodes corresponding to previously stored write data, and responsively appending together write data associated with those write commands that are characterized as forming the sequential write string in order to obtain a transfer block of a predetermined size for executing the write commands to the second memory space.

3. The recipient device of claim 2 wherein the command queue executes a single command node to transfer the transfer block to fill an entire stripe of storage capacity in a distributed storage system.

4. The recipient device of claim 2 wherein the circuitry characterizes each newly received write command as being either part of a sequential write string or a random write in relation to all previously buffered command nodes in the command queue.

5. The recipient device of claim 4 wherein in response to the characterization the circuitry replaces an existing random command node in the command queue with a sequential command node corresponding to one of the previously stored write data and subsequent write data associated with the respective newly received write command.

6. The method of claim 4 wherein in response to the characterization the circuitry replaces two existing sequential command nodes in the command queue with another sequential command node corresponding to two of the previously stored write data and subsequent write data associated with the respective newly received write command.

7. The recipient device of claim 2 wherein the command queue indexes one or more sequential command nodes corresponding to sequential write data stored in the first memory space and concurrently indexes one or more random command nodes corresponding to random write data stored in the first memory space.

8. The recipient device of claim 7 wherein the command queue resides in the first memory space.

9. The recipient device of claim 2 wherein in response to the characterization the circuitry modifies an existing command node in the command queue to correspond to one of the previously stored write data and subsequent write data associated with the respective newly received write command.

10. A method for transferring data from a first device to a recipient device, the recipient device having a first memory space and a second memory space, comprising:
    indexing a plurality of command nodes in a command queue corresponding to previously stored write data in the first memory space;
    receiving a write command from the first device to request transferring subsequent write data to the second memory space;
    comparing the subsequent write data to two or more of the previously stored write data in relation to the correspondence of the command nodes to determine if the subsequent write data is sequential to at least one of the previously stored write data;
    appending the subsequent write data to the previously stored write data in the first memory space that is determined to be sequentially related to the subsequent write data based on the comparing step; and
    repeating the receiving, comparing, and appending steps to obtain a transfer data block of a predetermined size of sequential write data for transfer from the first memory space to the second memory space.

11. The method of claim 10 wherein the predetermined size of the transfer data block is associated with a stripe of storage capacity in a distributed storage array of the second memory space.

12. The method of claim 10 wherein the comparing step is characterized by comparing the subsequent write data to all of the previously stored write data in relation to the correspondence of the command nodes to determine if the subsequent write data is sequential to any of the previously stored write data.

13. The method of claim 10 wherein the indexing step is characterized by the command queue indexing one or more sequential command nodes corresponding to sequential data stored in the first memory space and concurrently indexing one or more random command nodes corresponding to random data stored in the first memory space.

14. The method of claim 13 wherein the indexing step is characterized by indexing the sequential command nodes in a sequential command queue and indexing the random command nodes in a random command queue.

15. The method of claim 14 wherein the command queue resides in the first memory space.

16. The method of claim 13 wherein the appending step is characterized by modifying an existing command node to correspond to one of the previously stored write data and the subsequent write data.

17. The method of claim 13 wherein the appending step is characterized by replacing an existing random command node with a sequential command node corresponding to one of the previously stored write data and the subsequent write data.

18. The method of claim 13 wherein the appending step is characterized by replacing two existing sequential command nodes with another sequential command node corresponding to two of the previously stored write data and the subsequent write data.

19. The method of claim 13 further comprising flushing at least some of the random write data stored in the first memory space when the random command nodes correspond to a write data capacity that is greater than a predefined threshold.

20. The method of claim 19 further comprising flushing at least some of the sequential write data in the first memory space when the sequential command nodes correspond to a write data capacity that is greater than a total data storage capacity of the first memory space less the threshold and less a predefined margin.

* * * * *